Patented Dec. 14, 1948

2,456,594

UNITED STATES PATENT OFFICE 2,456,594

BRAZING ALLOY

Joseph F. Polak, Newark, N. J., assignor to Monroe Sherman, New York, N. Y.

No Drawing. Application March 22, 1945,
Serial No. 584,249

4 Claims. (Cl. 75—134)

My invention relates generally to alloys, and particularly to alloys for use in the brazing, welding and soldering processes.

Many alloys used in these processes include silver, copper, zinc and cadmium, the silver in amounts ranging between thirty and fifty percent or even higher, with relatively lower amounts of the other metals. In these alloys cadmium and zinc each make-up about twenty percent or less of the alloy. In some instances, larger amounts of zinc or of cadmium have been used, but always accompanied by a very small amount (of the order of two to five percent) of cadmium or zinc respectively.

I have discovered that the use of large amounts of silver is unnecessary and that an excellent and extremely useful brazing, welding and soldering alloy can be achieved by using relatively larger amounts of zinc and cadmium than of silver or of copper. I have found that alloys having more zinc and cadmium than the combined amount of silver and copper give very fine results when used in the above joining or uniting processes.

One of the factors in producing a good joint is the "wetting" properties of the alloy being used. As I use the term "wetting" means the spreadability of the alloy over the surface being treated, and those alloys using small amounts of zinc and large amounts of cadmium, or large amounts of zinc and small amounts of cadmium, do not spread readily, but tend to ball up when melted and are not distributed evenly over the surfaces worked upon. I have found that the alloys of my invention, using large amounts of both zinc and cadmium do not ball up, but spread readily and evenly, and combine with this feature a much lower melting and flow point than conventional zinc-cadmium containing alloys possess.

The silver, copper, zinc and cadmium may be combined, by weight within the following proportions, in order to achieve the alloys of my invention.

| Metal | Percent by weight |
|---|---|
| Silver | 10 to 25 |
| Copper | 3 to 10 |
| Zinc | 25 to 40 |
| Cadmium | 30 to 50 |

Several specific examples of alloys produced in accordance with my invention are:

| Metal | Percent by weight | | |
|---|---|---|---|
| | Ex. 1 | Ex. 2 | Ex. 3 |
| Silver | 23.10 | 15.40 | 11.55 |
| Copper | 6.90 | 4.60 | 3.45 |
| Zinc | 31.30 | 35.80 | 38.00 |
| Cadmium | 38.70 | 44.20 | 47.00 |

The brazing, welding or soldering alloy of Example 1 will melt and flow at 1030° F., while that of Example 2 will melt and flow at 950° F., and that of Example 3 will melt and flow at 925° F. Most conventional silver brazing alloys have a melting and flow point of about 1175° F., so it will be readily appreciated how much more useful will be the alloys of my hereinabove described invention.

My new and improved alloy is well adapted for use in processing either pure metals or alloys thereof, and I use the term "metals" to indicate that the materials being brazed, welded and/or soldered, may be either pure metals or alloys thereof. The term "alloy" is used to designate the material employed in the brazing, welding and/or soldering processes.

Commercially known brazing, welding and soldering alloys have a rather high melting and flow point (about 1175° F.) which limits their utility in the processing of metals wherein the critical temperatures would be reached at or about the time the alloys become liquid and free flowing. The duration of the application of heat and the degree of heat are both factors to be considered, and with brazing, welding and/or soldering alloys which melt and flow at about 1175° F., there is danger of damage to the metals being brazed or welded or soldered, because the critical temperatures of the steels and the annealing temperatures of the non-ferrous metals may well be reached before the high temperature brazing, welding, or soldering alloys will melt and flow.

These conventional high temperature brazing, welding and/or soldering alloys cannot be safely used when it is desired to make a second joint or weld in an assembly which has already been welded or joined, for the heat needed to make the second joint or weld may cause a melting and flowing in the area of the first joint or weld.

Further, thin metal sections being brazed, welded or soldered with the conventionally known high temperature alloys (i. e., those melting and flowing at about 1175° F.) present their own particular problem, for the application of heat thereto is very difficult to control and there is ever present the likelihood that the thin sections will be melted or otherwise damaged before the brazing, welding or soldering alloys will melt and flow.

My new and improved brazing, welding and/or soldering alloy thus has a much wider field of utility than those heretofore known, for it will melt and flow at much lower temperatures; thin section materials may be operated upon with relatively little danger; a number of joints or welds may be made in the same general area; and the critical temperatures or annealing temperatures of the metals being worked upon need not be approximated.

It will be noted that in my alloys the combined silver and copper content total thirty-five or less, and that the zinc comprises 25% or more, and the cadmium comprises 30% or more.

I have found, also, that tin and/or indium may be substituted for part of the zinc and/or cadmium, as described and claimed in my co-pending application Serial No. 584,248, and when used, no more tin or indium than fifty percent of the zinc or cadmium should be incorporated in the alloy, and that the properties of the alloy will remain substantially the same as above described.

Having now described my invention, what I claim and desire to secure by Letters Patent is:

1. An alloy consisting of by weight between 10 and 25 percent of silver, 3 and 10 percent of copper, 25 and 40 percent of zinc, the balance consisting of between 30 and 50 percent of cadmium.

2. An alloy comprising, by weight, 23.10% of silver, 6.9% of copper, 31.30% of zinc, and 38.70% of cadmium.

3. An alloy comprising, by weight, 15.4% of silver, 4.6% of copper, 35.8% of zinc and 44.2% of cadmium.

4. An alloy comprising, by weight, 11.55% of silver, 3.45% of copper, 38% of zinc and 47% of cadmium.

JOSEPH F. POLAK.

REFERENCES CITED

The following references are of record in the file of this patent:

UNITED STATES PATENTS

| Number | Name | Date |
| --- | --- | --- |
| 2,087,716 | Bancher | July 20, 1937 |
| 2,138,637 | Leach | Nov. 29, 1938 |
| 2,235,634 | Hensel | Mar. 18, 1941 |
| 2,279,284 | Wassermann | Apr. 7, 1942 |
| 2,288,655 | Smart | July 7, 1942 |
| 2,310,231 | Goldsmith | Feb. 9, 1943 |
| 2,362,892 | Durst | Nov. 14, 1944 |

FOREIGN PATENTS

| Number | Country | Date |
| --- | --- | --- |
| 798,964 | France | Mar. 14, 1936 |